United States Patent
Ennis

(10) Patent No.: US 8,118,043 B2
(45) Date of Patent: Feb. 21, 2012

(54) VEHICLE WASHING INSTALLATION WITH ARTIFICIAL TURF COVERED WASH BAY

(76) Inventor: G. Thomas Ennis, Inglewood, CA (US)

( * ) Notice: Subject to any disclaimer, the term of this patent is extended or adjusted under 35 U.S.C. 154(b) by 440 days.

(21) Appl. No.: 12/230,961

(22) Filed: Sep. 9, 2008

(65) Prior Publication Data

US 2010/0059090 A1    Mar. 11, 2010

(51) Int. Cl.
*B08B 3/02* (2006.01)
(52) U.S. Cl. ........................ 134/123; 134/201
(58) Field of Classification Search ............... 134/123, 134/201
See application file for complete search history.

(56) References Cited

U.S. PATENT DOCUMENTS

| | | | | |
|---|---|---|---|---|
| 3,299,901 A | * | 1/1967 | Axe et al. ................ | 134/123 |
| 3,450,266 A | * | 6/1969 | Allen .................... | 210/167.31 |
| 3,616,104 A | * | 10/1971 | Kuzmick ................ | 428/17 |
| 3,784,996 A | * | 1/1974 | Ambrose ................ | 15/21.2 |
| 4,039,075 A | * | 8/1977 | Gray .................... | 198/746 |
| 4,069,536 A | * | 1/1978 | Hartz et al. ............. | 15/104.92 |
| 4,226,064 A | * | 10/1980 | Kraayenhof ............. | 52/180 |
| 5,797,994 A | * | 8/1998 | Rasmussen .............. | 134/10 |
| 6,090,218 A | * | 7/2000 | Brackmann et al. ....... | 134/15 |
| 6,749,745 B2 | * | 6/2004 | Jowett .................. | 210/150 |
| 6,895,978 B2 | * | 5/2005 | Midkiff ................. | 134/104.1 |
| 7,273,642 B2 | * | 9/2007 | Prevost ................. | 428/17 |
| 7,273,643 B2 | * | 9/2007 | Nelson et al. ............ | 428/32.37 |

FOREIGN PATENT DOCUMENTS

JP    60-028813    *    2/1985

OTHER PUBLICATIONS

WIPO WO 2008/145775 (ES 2284417) Nov. 1, 2007.*
European Patent Office 2 154 038 Feb. 2010.*

* cited by examiner

*Primary Examiner* — Frankie L Stinson
(74) *Attorney, Agent, or Firm* — Mattingly & Malur, P.C.

(57) ABSTRACT

A vehicle washing installation includes a wash bay having a floor for supporting a vehicle to be washed and a washing apparatus for washing a vehicle. An artificial turf covers the floor of the wash bay which functions to pre-filter dirt and debris from the water used to wash the vehicle before the water is passed thru a water filtration system.

3 Claims, 4 Drawing Sheets

VEHICLE WASHING INSTALLATION WITH ARTIFICIAL TURF COVERED WASH BAY

BACKGROUND OF THE INVENTION

1. Field of the Invention

The present invention relates to an improved vehicle washing installation and, more particularly, to such an installation having a wash bay with a floor covered with artificial turf.

2. Description of the Related Art

Various prior art vehicle washing installations and systems have heretofore been known and which are in wide spread use for washing automobile, trucks, buses, railroad equipment and the like. A typical vehicle washing system includes a wash bay having a floor in which a conveyor is mounted for moving a vehicle through the installation and a series of power driven brushes and scrubber curtains are moved around and/or over the vehicle under a drenching spray of water and a cleaning agent such as soap or detergent to remove dirt, grease and other grime. The washed vehicle is then given a drenching spray of clean rinse water and is dried.

Operating economy and the need for water conservation require recovery and reuse of water which has been contaminated in the washing process and collected in a floor trench beneath the vehicle path. Fresh make-up water also must be introduced to supplement lost water which typically amounts to five to ten gallons during the washing of a vehicle. Recovered water is usually quite dirty and particulates and oily residue must be removed from the contaminated water before recycling through the system. A suitable filtration system for vehicle wash water is shown in my prior U.S. Pat. No. 4,652,368, which is incorporated herein by reference.

In passing recovered dirty water through a filter system, the dirt particles, grease and other debris cause wear in the filter systems and shorten their useful lives. Therefore there is a need for a means to prefilter the dirt out of the water as much as possible prior to running it through the filter system.

SUMMARY OF THE INVENTION

It is an object of the present invention to provide a vehicle washing installation having a wash bay floor covered with artificial turf which prefilters dirt and other debris from contaminated water and other cleaning liquids used to wash a vehicle.

Another object of the present invention is to provide a vehicle washing installation having an artificial turf covered wash bay which includes a drainage trench in the wash bay floor having an edging positioned along its outer edges to prevent dirt particles and other debris collected by the artificial turf from passing into the trench with the water used to wash a vehicle.

The present invention achieves the above and other objects by providing a vehicle washing installation which includes a wash bay having a floor for supporting a vehicle to be washed, a washing apparatus for washing the vehicle which includes a cleaning liquid supply means for supplying water to the vehicle and an artificial turf covering the floor of the wash bay for filtering out dirt particles and other debris from the water used to wash a vehicle prior to the water being drained out of the wash bay. The artificial turf preferably has drain holes extending through a base thereof to prevent the water from puddling or forming a lake on top of the artificial turf.

The vehicle washing installation further includes a first drainage trench in the floor which collects water and cleaning liquid applied to the vehicle. The artificial turf extends along at least one upper edge of the first drainage trench and an edging is positioned along the one upper edge adjacent the artificial turf, with the edging having holes therein which allows the water to pass thereto into the first drainage trench while holding back dirt particles and other debris. The first drainage trench preferably is covered with a grating and the artificial turf may extend over the grating. The artificial turf extending over the grating preferably has drain holes extending through the base thereof so that water may drain therethrough into the first drainage trench.

The vehicle washing installation further includes a conveyor for engaging a wheel of the vehicle to move the vehicle along the floor of the wash bay, with the conveyor being mounted in a second trench adjoining the side of the first drainage trench opposite from the one upper edge and the artificial turf extends along an outer edge of the second trench. An edging also is positioned along the outer edge of the second trench adjacent the artificial turf with the edging having holes therein which allow water to pass therethrough into the second trench from where the water drains into the first drainage trench.

The vehicle washing installation further may include a plurality of rotary brushes and a scrubber curtain for washing the sides and top of the vehicle.

These, together with other objects and advantages which will be subsequently apparent, reside in the details of construction and operation as more fully described and claimed hereafter, reference being made to the accompanying drawings forming a part hereof, wherein like numerals refer to like parts throughout.

DETAILED DESCRIPTION OF THE PREFERRED EMBODIMENTS

Figure 1:
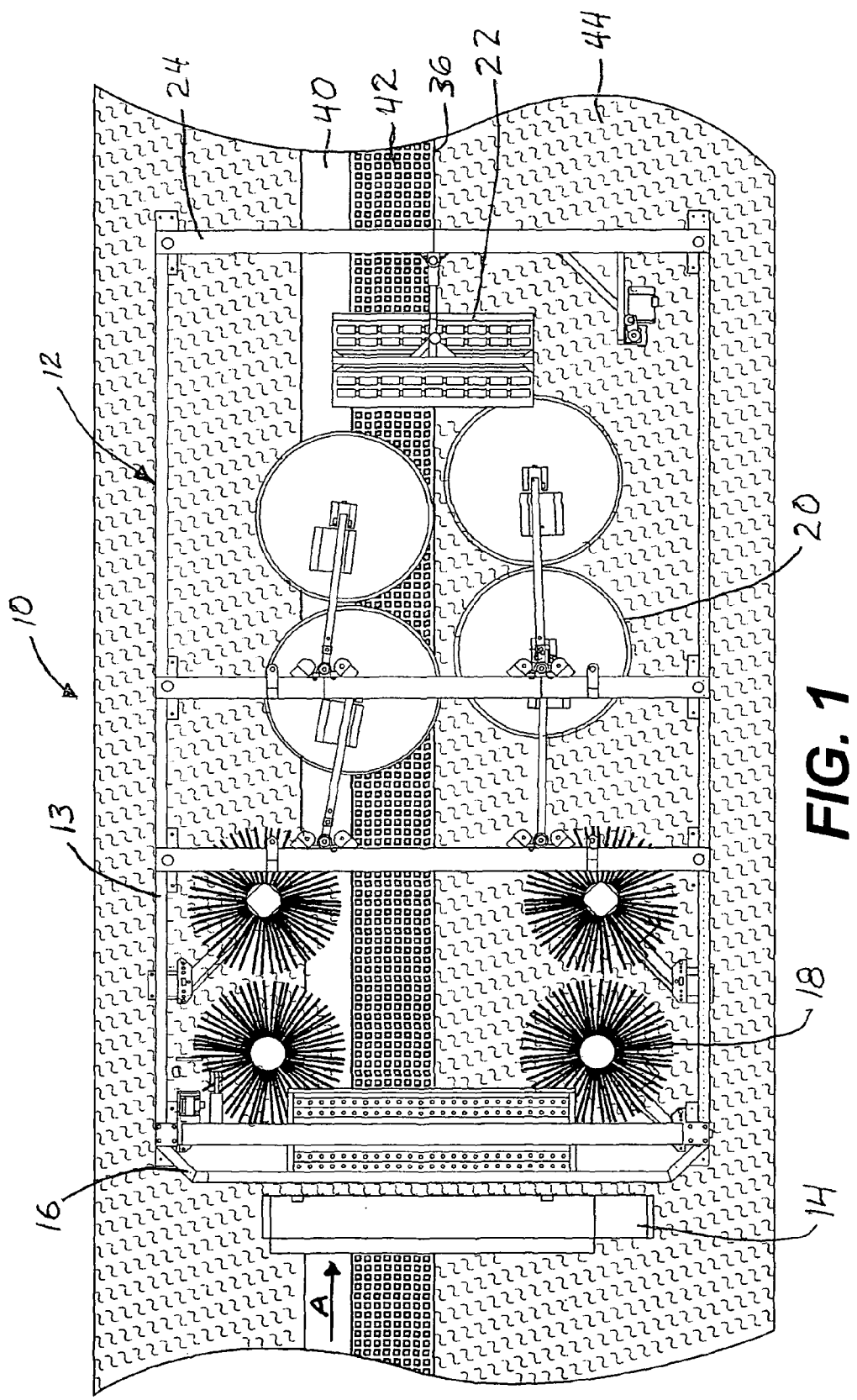
FIG. 1 is a top plan view of a vehicle washing installation according to the present invention showing an artificial turf material covering the floor of a wash bay of the installation.

Referring to the drawings, a vehicle washing installation, generally referred to by the numeral 10, is shown which includes a vehicle washing apparatus 12 extending over the path or position of a vehicle to be washed. The vehicle moves through the installation in the direction of arrow A shown in FIG. 1. The vehicle washing apparatus 12 includes a frame 13 which supports a cleaning liquid dispenser 14 at its front end followed by a first scrubber curtain 16, two sets of rotary rocker panel brushes 18, two sets of rotary wraparound brushes 20 and a second scrubber curtain 22. This vehicle washing apparatus is typical of the types of automatic washing apparatuses which may be used in connection with the present invention. Other types of washing apparatuses may be used including those which use means other than brushes, such as high pressure cleaning fluid devices. Moreover, the car installation shown in FIG. 1 only includes a vehicle washing apparatus and does not illustrate the entrance to the installation or air drying means which conventionally are at the end of the installation. These are well known in the art. The frame 13, also may include a final arch 24 at the end of the frame which may have high pressure nozzles thereon for spraying rinse water on a vehicle being washed. Alternatively, a separate arch may be provided for applying rinse water to a washed vehicle.

Figure 2:
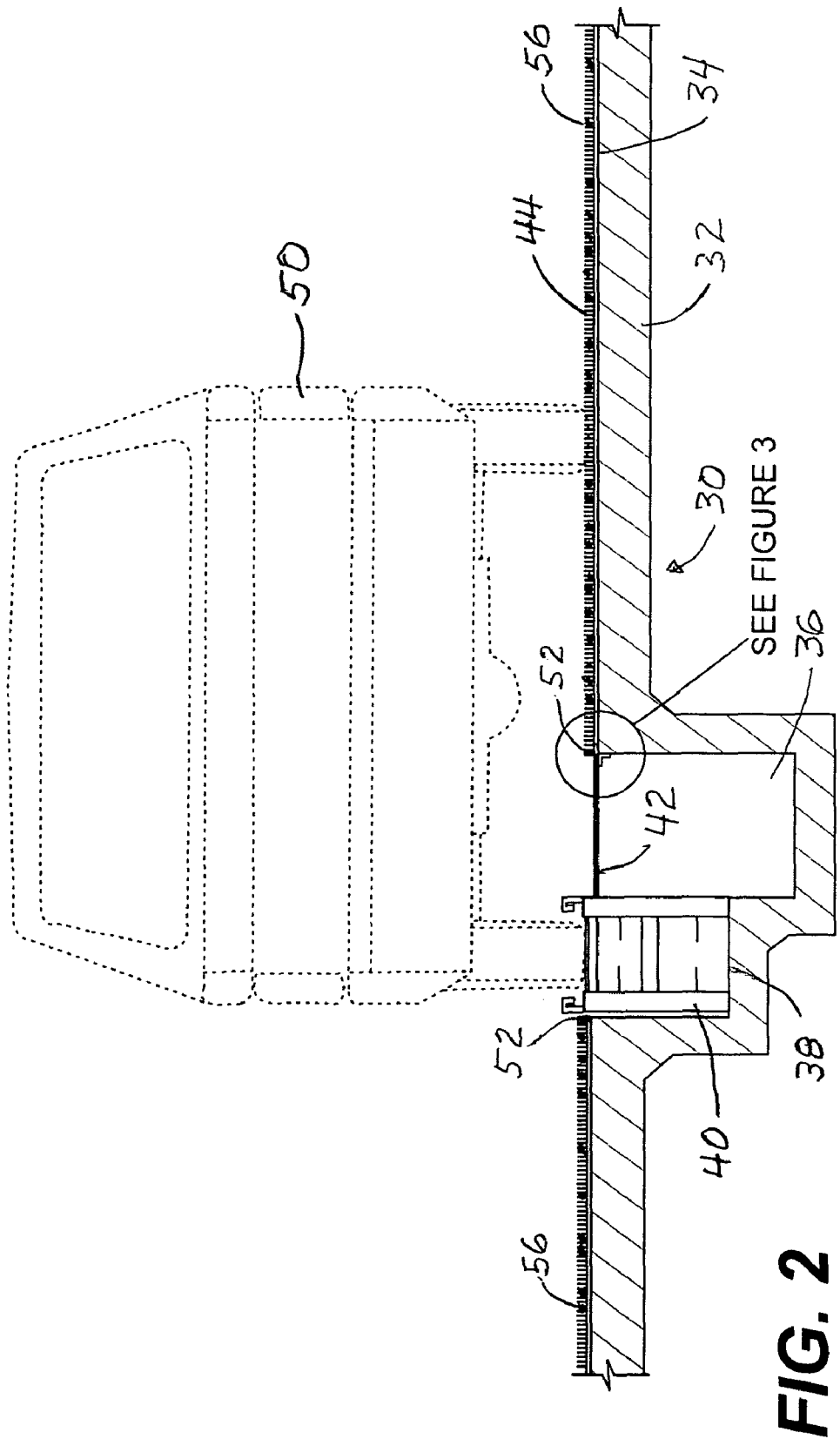
FIG. 2 is a cross sectional view taken through the floor of the wash bay illustrating a car supported on the floor of the wash bay having artificial turf covering the floor and a conveyor moving the car through the installation.

As clearly shown in FIGS. 1 and 2, the car wash installation includes a wash bay, generally indicative by the numeral 30 in FIG. 2 formed by a concrete slab 32. The top of the slab 32 forms a floor 34 for the car wash installation and also acts as a drainage surface or pit for cleaning liquids applied to a vehicle 50 being washed.

As further shown in FIG. 2, the concrete slab 32 is formed with a first drainage trench 36 which extends downwardly from the floor of the slab. A second trench 38 is formed adjacent the first drainage trench 66 on the left hand side thereof as shown in FIG. 2. Installed in the second trench 38 is a conveyor 40 having rollers for engaging one or more tires of a vehicle on the driver's side of the vehicle. The first drainage trench 36 preferably is covered by a grating 42. The wash bay floor 34 is slanted towards the drainage trench 42 on both sides thereof so that the dirty water and other cleaning fluids used to wash the car may drain into the drainage trench. On the left hand side of the drainage trench 36, the water and other liquids first drain into the second trench 38 and then into the first drainage trench 36.

Figure 4:
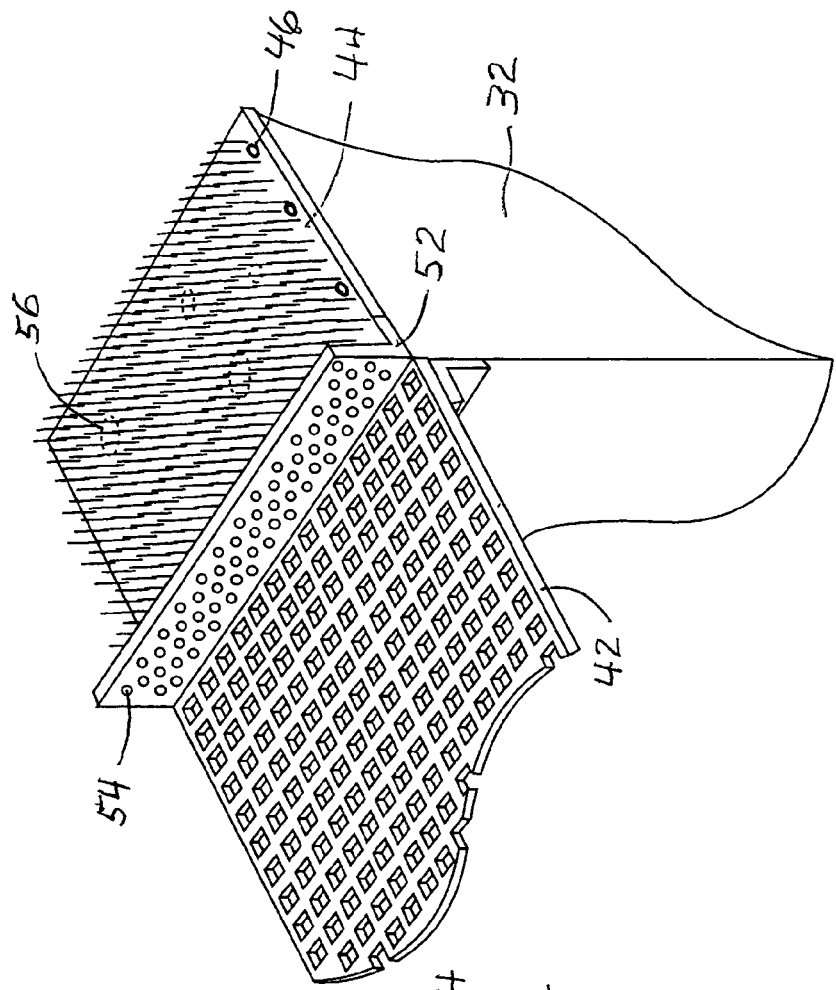
FIG. 4 is a perspective view of the enlarged portion of the washing installation shown in FIG. 3 illustrating perforations or holes in the edging.
Figure 3:
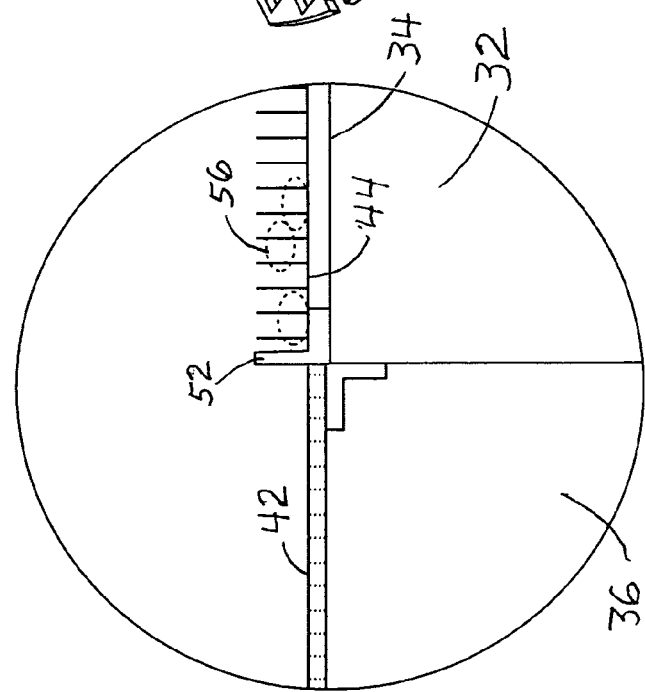
FIG. 3 is an enlarged view of the circle portion shown in FIG. 2 illustrating a grating over the top of a drainage trench and an edging separating the artificial turf from the drainage trench.

The wash bay floor 34 is covered with an artificial turf material 44 which is constructed of a suitable plastic material such as nylon, polyethylene or a combination of polyethylene and nylon and is comprised of a base having fibrous filaments upstanding therefrom. In one embodiment of the invention, as shown in FIGS. 1-4, artificial turf extends up to the edge of the first drainage trench 36 all along the length thereof on the right hand side and all the way up to the edge of the second trench 38 all along the outer edge thereof. The artificial turf 40 preferably is provided with a plurality of holes 46 in the base thereof as shown in FIG. 4 to permit water to pass through the base so that the water does not puddle or form a lake on top of the artificial turf.

An edging 52 comprised of an L-shaped bar constructed of a suitable material such as plastic or aluminum is provided all along the upper right edge of the first drainage trench 36. The edging 52 is provided with a plurality of holes 54 as shown in FIG. 4 so that liquid from the top of the artificial turf 44 may drain through the holes and through the grate to the first drainage trench 36. A similar edging 52 also may be provided all along the upper left edge of the second trench 38.

The artificial turf covering the floor of the wash bay is highly advantageous in that the filaments sticking up from the base of the artificial turf collect dirt particles and other debris from the dirty water used to wash a vehicle. These dirt particles are designated by the numeral 56 in FIGS. 2, 3 and 4.

Suitable artificial turf materials are made by SYNLawn, a particular suitable artificial turf made by SYNLawn is designated SYN BERMUDA 300 and is constructed of nylon and polyester and has filaments which extend out from the base approximately one inch.

The artificial turf serves a very useful purpose in that it traps a significant portion of the dirt particles and other grime and removes it from the used water as the used water flows towards the drainage trench 36. The perforated edging 52 permits the used water and other cleaning liquids to flow through the holes 54 without letting much of the dirt particles and other grime to be carried therewith. As shown in FIG. 4, the holes 54 in the edging are spaced a short distance above the bottom of the edging so that the bottom of the edging traps the dirt particles and prohibits them from passing beyond the edging into the drainage trench. By prefiltering and removing many of the dirt particles from the used water and other cleaning liquids, the water which is collected in the drainage trench 36 and then subsequently passed through a suitable water filtration system, contains much less dirt and debris and therefore does not wear out the elements such as pumps, filters and the like of the filtration system as quickly. Therefore the life of the filtration system is prolonged.

Whenever the artificial turf becomes filled with dirt particles and other grime, the washing operation may be stopped and the artificial turf vacuumed with an ordinary shop vacuum device to remove the dirt particles and other grime from the artificial turf. The vacuum device has a bag which may be disposed of when full.

The artificial turf covers the floor of the wash bay so that the right side tires of the vehicle pass over the turf as shown in FIG. 2 whereby the turf stabilizes the vehicle and keeps the left side tires from leaving the pusher rollers of the conveyor.

Figure 5:
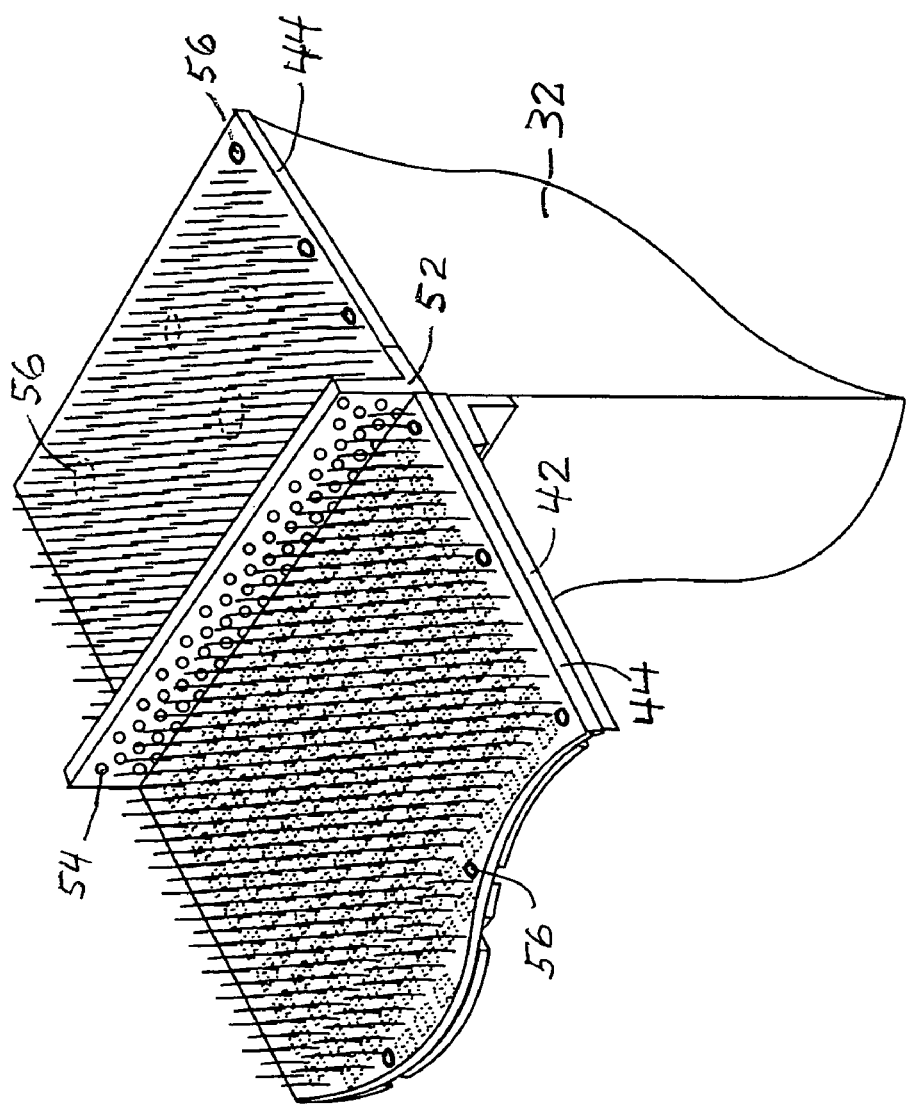
FIG. 5 is a perspective view showing the portion of FIG. 3 in another embodiment in which the artificial turf also covers the grating over the drainage trench.

A second embodiment of the invention is shown in FIG. 5 wherein the artificial turf 44 also may be placed over the grating 42 so that dirt particles which may have passed through the holes 54 in the edging 52 may be removed from the water prior to the water draining into the drainage trench 36. The artificial turf 44 covering the grating also has holes 46 therein to permit the water to drain therethrough.

Numerous other modifications and adaptations of the present invention will be apparent to those skilled in the art and thus, it is intended by the following claims to cover all such and adaptations which fall within true spirit and scope of the invention.

What is claimed is:

1. A motor vehicle washing installation comprising:
   a wash bay having a floor for supporting a vehicle to be washed;
   an artificial turf covering the floor of the wash bay, acting as a prefilter;
   a washing apparatus for washing the vehicle, said washing apparatus including a cleaning liquid supply means for applying a cleaning liquid to the vehicle;
   a first drainage trench in the floor which collects liquid applied to the vehicle and wherein said artificial turf extends along at least one upper edge of said first drainage trench; and
   an edging positioned along said one upper edge adjacent said artificial turf, said edging having holes therein which allow liquid to pass therethrough into said first drainage trench.

2. The motor vehicle washing installation according to claim 1 wherein said first drainage trench is covered with a grating, said artificial turf extends over said grating and said artificial turf has drain holes extending through a base thereof.

3. A motor vehicle washing installation comprising:
   a wash bay having a floor for supporting a vehicle to be washed;
   an artificial turf covering the floor of the wash bay acting as a prefilter;
   a washing apparatus for washing the vehicle, said washing apparatus including a cleaning liquid supply means for applying a cleaning liquid to the vehicle;
   a first drainage trench in the floor which collects liquid applied to the vehicle and wherein said artificial turf extends along at least one upper edge of said first drainage trench;
   an edging positioned along said one upper edge adjacent said artificial turf, said edging having holes therein which allow liquid to pass therethrough into said first drainage trench;

a conveyor for engaging a wheel of the vehicle for moving the vehicle along the floor, said conveyor being mounted in a second trench adjoining a side of said first drainage trench opposite from said one upper edge and wherein said artificial turf extends along an outer edge of said second trench; and an edging positioned along said outer edge adjacent said artificial turf, said edging having holes therein which allow water to pass through into said second trench.

* * * * *